Figure 1:
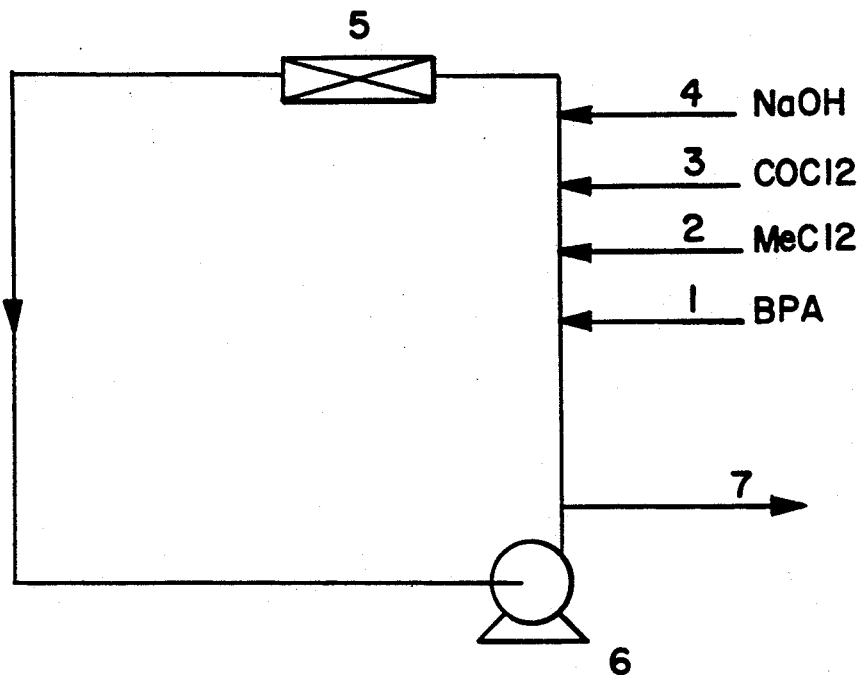

United States Patent [19]

van Hout et al.

[11] Patent Number: 5,210,172

[45] Date of Patent: May 11, 1993

[54] METHOD FOR THE CONTINUOUS PREPARATION OF CARBONATE OLIGOMERS WITH LOOP REACTOR, STATIC MIXER AND PLUG FLOW

[75] Inventors: Hendricus H. M. van Hout, Halsteren; Martin H. Oyevaar, Goes; Bert J. Held, Bergen op Zoom, all of Netherlands

[73] Assignee: General Electric Company, Pittsfield, Mass.

[21] Appl. No.: 736,183

[22] Filed: Jul. 26, 1991

[51] Int. Cl.$^5$ ............................................. C08G 64/20
[52] U.S. Cl. ..................................... 528/196; 526/64; 526/65; 528/198; 528/199
[58] Field of Search ....................... 528/196, 198, 199; 526/64, 65

[56] References Cited

U.S. PATENT DOCUMENTS 4,112,112 10/1978 Koda et al. ..................... 528/196
5,037,941 8/1991 Weston et al. .................. 528/196

Primary Examiner—Harold D. Anderson

[57] ABSTRACT

The invention relates to a method for the continuous preparation of carbonate oligomers by boundary face oligomerization of aromatic dihydroxy compounds with phosgene while adding base, in which the reaction is carried out in a loop-like reactor system in the absence of chain stopper and while using less than 200 ppm of catalyst related to the organic solvent using at least one static mixer and plug folw, optionally in combination with a stirred tank reactor.

8 Claims, 1 Drawing Sheet

METHOD FOR THE CONTINUOUS PREPARATION OF CARBONATE OLIGOMERS WITH LOOP REACTOR, STATIC MIXER AND PLUG FLOW

The invention relates to a method for the continuous preparation of carbonate oligomers by boundary face oligomerisation of aromatic dihydroxy compounds with phosgene in the presence of catalyst and while adding base.

The general concept of the preparation of aromatic carbonate oligomers is described in U.S. Pat. No. 4,737,573, in which the preparation of polycarbonate is divided into two steps, namely a first step in which the bivalent phenol is converted with phosgene into a chloroformate which is then oligomerised, and a second step in which the ultimate polymer of high molecular weight is prepared. This preparation of oligomer via the chloroformate has several advantages, for example, a better quality of the ultimate polymer product and an improved productivity and safety. According to the said Patent Specification the preparation of oligomer may be carried out both in discontinuously stirred vessels and in continuously stirred vessels as reactors. In the said Patent Specification and hereinafter the continuously stirred vessels are abbreviated as CSTR.

According to U.S. Pat. No. 4,122,112 the reaction components are first mixed in a tubular reactor, in which the first phosgenisation occurs, after which the mixture is further converted into oligomer in a CSTR. U.S. Pat. No. 3,974,126 discloses a preparation of oligomer in a tubular reactor without plug flow. As appears from the specific examples of the two Patent Specifications, more water than organic solvent must be used, which is unfavourable.

GB-A-1,455,976 discloses the preparation of carbonate oligomers in a reaction loop, in which the addition of the reaction components occurs before the assembly is mixed by a transport pump and is further conveyed. A separate mixer is not present in this case. Chlorobenzene serves as a solvent in this case but is present in a smaller quantity than the water. Moreover, the process has to be carried out at temperatures of at least 70° C.

EP-A-0 304 691 uses static mixers in combination with pipelines, but does not relate to the preparation of oligomers, but to the preparation of prepolymers having molecular weights from 4,000 to 12,000. p-Tert.butylphenol as a chain stopper is used already at the beginning of the reaction, which, however, gives rise to the formation of the by-product diphenyl carbonate, which is undesired. As further appears from the specific examples, an uneconomically large excess of phosgene is used.

The invention now provides a method with which oligomers having a molecular weight of less than 4,000 are prepared in an economic manner.

For this purpose the invention provides a method for the continuous preparation of carbonate oligomers by boundary face oligomerisation of dihydroxy compounds with phosgene in the presence of catalyst and while adding base, which method is characterised in that the reaction is carried out in a loop-like reactor system in the absence of chain stopper and while using at most 200 ppm of catalyst related to the organic solvent and using at least one static mixer and plug flow, optionally in combination with a stirred tank reactor.

The method according to the invention provides several advantages, for example, low investment costs, avoiding the formation of diaryl carbonates, a constant quality of the produced oligomers, and furthermore an efficacious removal of the heat of reaction, low ratios between water and organic solvent, high conversions of monomer and very efficient use of the phosgene, so that large excesses hereof are not necessary.

The oligomers prepared according to the present invention have molecular weights in the range from 400 to 4,000.

The starting product for the preparation of the present oligomers is a dihydroxy-aromatic compound. 2.2-Bis(4-hydroxyphenyl)propane, also known as bisphenol A, is to be preferred most. However, any other dihydroxy-aromatic compound may be used and in this connection reference is made to U.S. Pat. No. 4,737,573, column 3, line 41 to column 4, line 38.

The further substances used in the reaction are the conventionally used substances in which, however, a chain stopper is not used. Phosgene is used in a slight excess, i.e. more than 1 mol, but less than 1.3 mol per mol of starting compound. Dichloromethane is conventionally used as an organic solvent. A preferably used condensation catalyst is triethylamine which in this case is used in a quantity of 10–200 ppm related to the organic solvent. The process is carried out at a temperature of 10°–60° C. and the pH of the mixture is kept in the range from 8 to 11. When bisphenol A is used as a starting material, a quantity of triethylamine of 50–100 parts by volume per million parts by volume of dichloromethane is preferably used, as well as a temperature of 30°–50° C. In these circumstances the residence time is from 5 to 20 minutes.

The invention will now be described in greater detail with reference to the accompanying drawing, the sole Figure of which shows two embodiments of suitable reactor loops.

FIG. 1 shows a reactor loop with a static mixer. The reaction components are added via the pipes 1, 2, 3 and 4 and mixed in the static mixer 5. The mixture is circulated by means of the pump 6 and a part of the conveyed mixture is continuously removed at 7.

Figure 2:
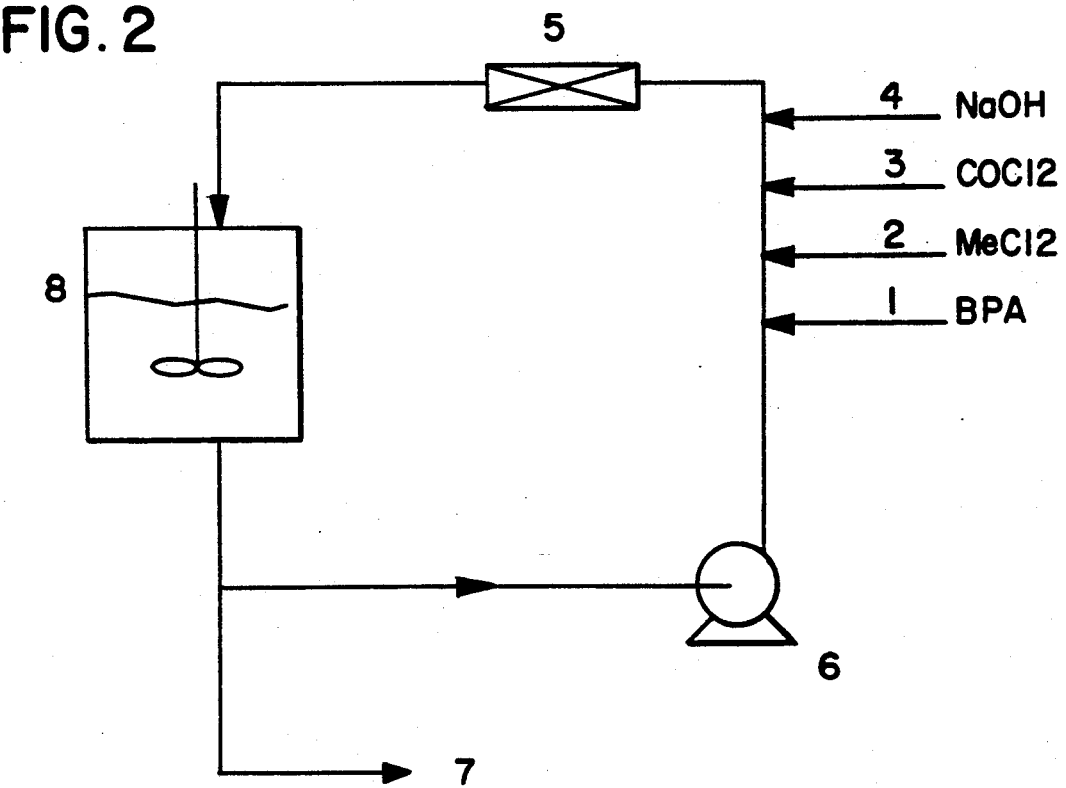

FIG. 2 shows a loop in which a stirring vessel (CSTR) 8 is incorporated. In this case the outlet 7 is situated behind the said CSTR.

EXAMPLE 1

Oligomers were prepared in a reactor loop of 0.5 l having a block of 3 static mixers of a diameter of 6.0 mm. The reactor was immersed in a waterbath for controlling the temperature. $COCl_2$ (0.1 kg/h), dichloromethane (2.1 kg/h) and 5% by weight of lye (0.07 l/h) were supplied continuously and the said components were mixed—immediately before the mixers—with 1.15 l/h of a solution of 1,040 g of bisphenol A (BPA), 808 ml of 33% by weight sodium hydroxide solution and 4,677 ml of water. The preparation was carried out at a temperature of 25° C. and the ultimate pH was 10.0 with a recirculation ratio of more than 10.

The remaining BPA contents in the organic and aqueous phases were 45 and 75 ppm, respectively, so that the conversion of BPA was more than 99.9%. The ratio between hydroxyl terminal groups and chloroformate terminal groups in the oligomer was 0.5.

EXAMPLE 2

The same process as described in Example 1 was carried out, with the proviso that all the flow rates were doubled.

The remaining BPA contents in the organic and aqueous phases had now increased to 250 and 900 ppm, respectively, which means a BPA conversion of only 99.2%. The ratio between hydroxyl terminal groups and chloroformate terminal groups in the oligomer had decreased to 0.3.

EXAMPLE 3

The same process as described in Example 2 was carried out, but this time a temperature of 40° C. was used, which resulted in an improved BPA conversion. The remaining BPA contents were 90 ppm in the aqueous phase and 390 ppm in the organic phase, so that the BPA conversion was 99.6%. The ratio between hydroxyl terminal groups and chloroformate terminal groups was 0.4.

However, in this experiment the hydrolysis of $COCl_2$ was much stronger than in the Examples 1 and 2. Said hydrolysis was 0.40 mol of $COCl_2$/mol of BPA, while in the examples 1 and 2 said hydrolysis was only 0.11 and 0.15, respectively. The number-averaged molecular weights of the oligomers for all three examples were in the range from 400 to 800.

EXAMPLE 4

In this example a concentrated BPA solution used. This solution comprised 3,000 g of BPA, 920 ml of sodium hydroxide solution (33% by weight) and 2,620 ml of water. $COCl_2$ (0.27 kg/h), dichloromethane (1.8 kg/h) and 20% by weight of lye (0.46 l/h) were continuously added and these were mixed immediately before the mixers with 1 l/h of the BPA solution. The reaction temperature was 40° C. and the ultimate pH was 9.5.

The remaining BPA contents in the organic and aqueous phases were 1,050 and 2 ppm, respectively, which means a BPA conversion of 99.6%. The hydrolysis of $COCl_2$ was only 0.04 mol per mol of BPA. The ratio between hydroxyl terminal groups and chloroformate terminal groups in the oligomer was 0.4 and the number-averaged molecular weight of the oligomer was 900.

EXAMPLE 5

The same process as in Example 4 was carried out, but this time all inlet flows were doubled, while, in contrast with all the preceding Examples, catalyst was also added, namely triethylamine (TEA) in a quantity of 50 ppm (wt/vol of $MeCl_2$).

The operation of the reactor proved to be stabler in the presence of TEA than in the preceding examples. Remaining BPA contents of less than 1,000 and less than 2,500, respectively, were found in the organic and aqueous layers, so that the conversion rates of BPA were always above 99%. The hydrolysis was 0.06-0.08 mol of $COCl_2$/mol of BPA; the ratio between hydroxyl terminal groups and chloroformate terminal groups was 0.4-0.5 and the number-averaged molecular weight of the oligomers was in the range from 600 to 1,000.

We claim:

1. A method for the continuous preparation of carbonate oligomers by boundary face oligomerisation comprising reacting at least one aromatic dihydroxy compound with phosgene in the presence of less than 200 parts per million of catalyst relative to organic solvent, while adding base, in the absence of chain stopper, in a reactor system comprising a loop-like reactor system at least one static mixer and plug flow, optionally in combination with a stirred tank reactor.

2. A method as claimed in claim 1, wherein reactor system comprises reactor loop with only plug flow and one or more static mixers.

3. A method as claimed in claim 1 wherein reactor system comprises a reactor loop with plug flow and one or more static mixers in combination with plug flow and one or more static mixers in combination with a stirred tank reactor.

4. A method as claimed in claim 1 wherein bisphenol-A is the aromatic dihydroxy compound.

5. A method as claimed in claim 4 wherein dichloromethane is the organic solvent, triethylamine is the catalyst and is present in a quantity of 50–100 ppm.

6. A method as claimed in claim 2 wherein bisphenol-A is the aromatic dihydroxy compound.

7. A method as claimed in claim 3 wherein bisphenol-A is the aromatic dihydroxy compound.

8. The method in accordance with claim 1 wherein a catalyst is present.

* * * * *